W. H. BRISTOL.
SPEED RECORDER.
APPLICATION FILED JAN. 7, 1911.

1,000,148.

Patented Aug. 8, 1911.

Witnesses
John E. Prager
Frank C. Holbrook

Inventor
William H. Bristol
By Attorney

UNITED STATES PATENT OFFICE.

WILLIAM H. BRISTOL, OF WATERBURY, CONNECTICUT.

SPEED-RECORDER.

1,000,148.  Specification of Letters Patent.  Patented Aug. 8, 1911.

Application filed January 7, 1911. Serial No. 601,274.

*To all whom it may concern:*

Be it known that I, WILLIAM H. BRISTOL, a citizen of the United States, and a resident of Waterbury, in the county of New Haven and State of Connecticut, have invented certain new and useful Improvements in Speed-Recorders, of which the following is a specification.

The invention relates to apparatus for recording the speed, and variations thereof, of rotating mechanism, more particularly of vehicles of the self-propelled class.

The invention has for its object to provide apparatus of this character which shall be simple in construction, so arranged that the chart or record sheet upon which the record is to be made may be readily inserted and replaced without in any way interfering with the marking member; and, also, in such a manner that access to the chart is not possible without effecting a record of the same upon the said chart.

It has for its further object to so control the movement of the marking member for producing the record, that the said record may serve also to indicate variations in speed, as well as a reverse rotation, all records disclosing also the actual time and duration of the speed and variations thereof.

To this end the invention consists in certain features of construction hereinafter set forth, and shown in the accompanying drawings, in which—

Figure 1:
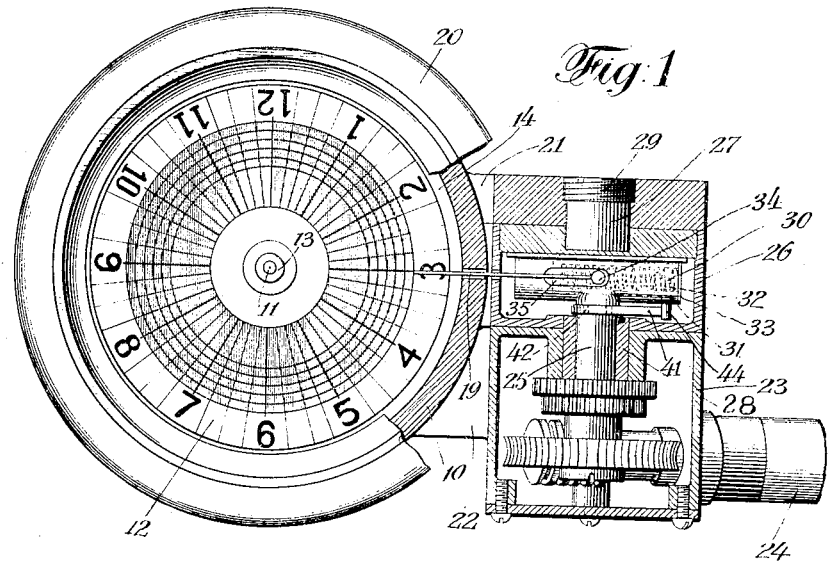
Figure 2:
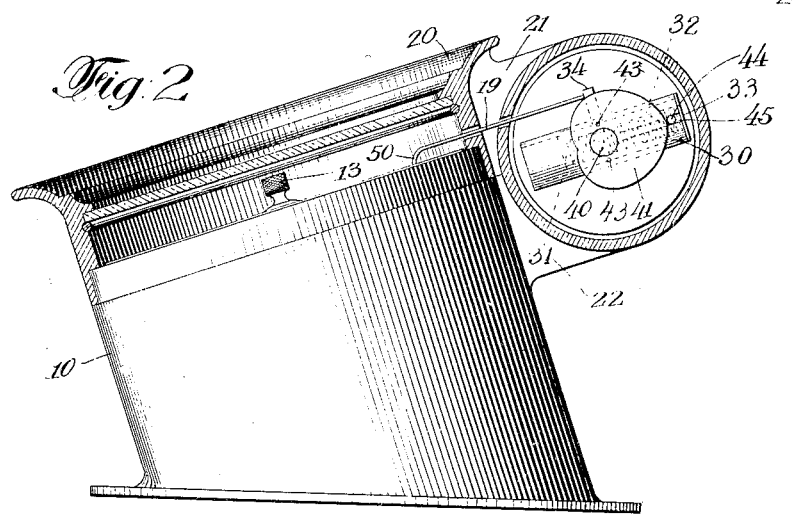
Figure 3:
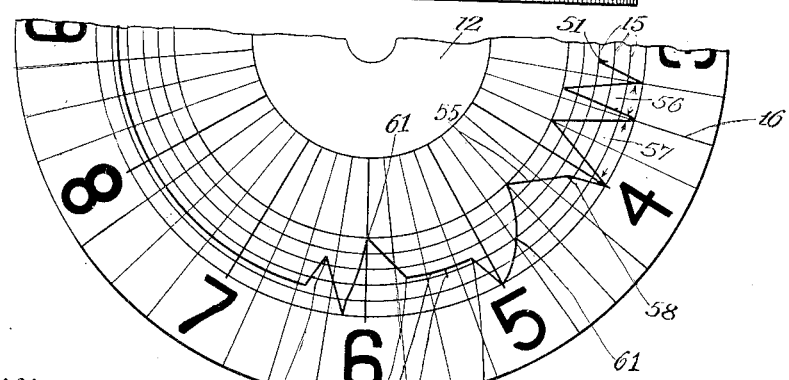

Figure 1 is a plan of the improved device, a portion of the same being shown in section. Fig. 2 is an elevation of the same with a portion shown in section and a portion removed. Fig. 3 is a fragmentary view illustrating, on an enlarged scale, a portion of the chart and a record made thereon, the record for the sake of clearness being shown in black lines, whereas in actual practice the surface of the chart would be dark and the record light.

Similar characters of reference designate corresponding parts throughout the several views.

Referring now to the drawings, 10 designates a suitable casing adapted to retain a clock mechanism (not shown) and which rotates an arbor 11. This arbor in turn is adapted to rotate a chart 12 at a uniform speed, and which may be attached thereto in well-known manner by means of a securing nut 13. A plate 14 is provided beneath the chart 12 as a support for the same and as a cover for the mechanism contained in the casing 10.

The chart itself is divided radially by concentric circles and angularly by radii, the former divisions 15 serving as the distance divisions, each one corresponding to a predetermined number of miles, or other measure of distance. The latter, angular divisions 16 are the time divisions. The chart, preferably, is of the smoked surface type such as that disclosed in my prior U. S. Letters Patent No. 748,918, the smoked portion being adapted to be removed by a metal marking member 19, or the like, adapted to move over the same, thus dispensing with all inking mechanism. Above this chart is arranged a suitable cover 20, which is hingedly connected to the casing 10 in such a manner that upon swinging open the cover the marking member 19 will have a similar movement off the said chart 12. Ready access to the chart may thus be had for the purpose of insertion or replacement of the same.

Extending rearwardly from the casing 10 are brackets 21 and 22, the latter carrying a casing 23 containing suitable transmission mechanism adapted to impart rotation, from a flexible shaft 24, to a shaft 25. The flexible shaft 24 is actuated from any rotating mechanism, the speed of which it is desired to record on the chart 12. For example, the same may be driven from the rotating axle of an automobile (not shown); but I do not wish to restrict myself to any specific manner of driving the shaft 25. Between the two brackets 21 and 22 is located a movable casing 26 forming part of, or fixedly secured to the cover 20. This movable casing 26 is hingedly secured to the aforesaid brackets by means of a pin 27 or the like, passing from bracket 21 into casing 26; and by means of a bushing 28, passing from the casing 23 into the casing 26. The bushing 28 serves also as a bearing for shaft 25; and the pin 27 may be held in position by means of a suitable screw plug 29.

Within the casing 26 and fixedly secured thereto is a cylinder 30 whose longitudinal axis lies in a plane at right angles to the chart 12 and passing through the axis of said chart and through the marking member 19. This allows for a convenient arrangement of the parts, but I do not wish to be restricted to the same. Within the cylinder 30 is adapted to reciprocate a piston 31, in the form of a cylinder closed at one end and containing a spring 32 adapted to advance the same toward the center of the chart 12. One end of the spring 32 contacts with the inner surface of the head of the said piston, and the other abuts a suitable cap 33 soldered or otherwise secured to the end of the cylinder 30. A pin 34 extends upwardly from the piston 31 through a slot 35 in the upper surface of cylinder 30, and within which slot the same is guided during the reciprocation of piston 31, preventing at the same time any lateral displacement of the said piston. The marking member 19 is fixedly attached in any suitable manner to this pin 34, and partakes of the reciprocating motion of the same to move radially back and forth over the chart 12. To effect this reciprocation of piston 31, and thereby of the marking member 19, I employ the following means: Extending laterally from cylinder 30 is a journal 40 adapted to carry a cam 41, which in turn is arranged to be driven from the shaft 25. To effect this drive, I provide suitable driving pins 42 extending from the end of shaft 25 into recesses 43 provided in the cam 41, the end of said shaft preferably contacting with the cam. The cam surface of cam 41 engages a pin 44 extending laterally from piston 31 through a slot 45 in the cylinder 30. The cam 41 is so designed that it will advance and retract the marking member 19 equal amounts for equal increments of angular motion of the said cam.

The marking end 50 of the marking member 19 is preferably given a slight bend, Fig. 2, and is made to be flexible in a direction substantially at right angles to the chart, so that the end 50 will come into contact with the surface of the chart shortly before the cover 20 is completely closed. Upon completely closing the cover, a slight radial mark 51, Fig. 3, will be made upon the chart, and thus produces a record of the closing. Upon opening the said cover 20, this pressure is of course relieved, and the end 50 is drawn slightly outwardly, thus producing a second radial mark 52 upon chart 12. If the cover be then immediately closed, the mark 52 will designate both the opening and closing of the cover, as the two marks thus produced will coincide. In this manner any opening or closing of the cover, whether authorized or otherwise, as well as the time of the same, will be recorded upon the chart.

The actual record 55 made by the marking end 50 upon chart 12, to record the speed desired to be recorded is obtained as follows: As shaft 25 is rotated from any suitable source, through the flexible shaft 24 and intermediate transmitting mechanism in the casing 23, it correspondingly rotates cam 41, permitting thus the piston 31 to reciprocate within cylinder 30. This reciprocation is imparted, as explained, to the marking member 19 whose marking point 50 travels radially back and forth over the smoked surface of the chart 12 and at a rate depending upon the speed of rotation of said cam, which in turn is a measure of the speed of the rotating mechanism, a record of whose speed is desired. The chart 12 itself being uniformly rotated, the time element is thus obtained, and the angularity of the successive alternating records made upon the chart serve to indicate the variations in speed. For example, the portion 56 of the record 55 designates a uniform speed between the hours 3.15–3.30, the record being a straight line (reversed). The portion 57 designates also a uniform speed, but a slower speed than that comprised by the portion 56. At the point 58 of the record, a change in the speed is indicated; and at the point 59, the speed is zero and remains so until the point 60 is reached, where the vehicle or other device again provides rotation. If the record be not a straight line as at the portion 61, a change in speed is indicated, with the exception of when the speed is zero in which case the record is an arc 62. Were it not for the fact that equal increments of angular motion of the cam produced equal amounts of the movement of the marking member 19, it would be impossible to thus interpret the record. In the case of a reversal of the direction of rotation, the record likewise reverses in direction, as at 63. Any such reversal at a point between the extreme limits of the record will thus indicate that the direction of rotation has been reversed. The arrangement of mechanism actuating the marking member is such as to accommodate the reversal.

I claim:—

1. A speed recorder comprising: a suitable casing, and a cover therefor; a chart support within said casing for a rotatable chart; a marking member passing through said cover and movable therewith; and means to move the same over said chart.

2. A speed recorder comprising: a suitable casing, and a cover therefor; a chart support within said casing for a rotatable chart; a marking member passing through said cover and movable therewith; and means to reciprocate the same radially over the chart.

3. A speed recorder comprising; a suitable casing, and a cover therefor; a chart support within said casing for a rotatable chart; a second casing; a marking member passing through said cover and movable therewith; and mechanism within said second casing to move said marking member over said chart.

4. A speed recorder comprising: a suitable casing, and a cover therefor; a chart support within said casing for a rotatable chart; a second casing carrying said cover and hingedly connected with said first casing; a marking member passing through said cover and movable therewith; and mechanism within said second casing to move said marking member over said chart.

5. A speed recorder comprising: a suitable casing, and a cover therefor; a chart support within said casing for a rotatable chart; a second casing carrying said cover and hingedly connected with said first casing; a marking member passing through said cover and movable therewith; mechanism within said second casing to move said marking member over said chart; and intermediate mechanism to transmit rotary motion to said mechanism from the apparatus whose speed is to be recorded.

6. A speed recorder comprising: a suitable casing, and a cover therefor; a chart support within said casing for a rotatable chart; a second casing hingedly connected to said first casing; a marking member extending from said second casing through said cover and over the chart; and means within said second casing to impart a reciprocatory motion to the said marking member.

7. A speed recorder comprising: a suitable casing; a chart support within the same for a rotatable chart; a second casing hingedly connected to said first casing; a marking member extending from said second casing over the chart; means within said second casing to impart a reciprocatory motion to the said marking member, and comprising a cylinder; a piston movable therein; means connecting said piston with said marking member; and means to reciprocate said piston.

8. A speed recorder comprising: a suitable casing; a chart support within the same for a rotatable chart; a second casing hingedly connected to said first casing; a marking member extending from said second casing over the chart; means within said second casing to impart a reciprocatory motion to the said marking member, and comprising a cylinder; a piston movable therein; means connecting said piston with said marking member; a cam to reciprocate said piston; and means to rotate said cam.

9. A speed recorder comprising: a suitable casing; a chart support within the same for a rotatable chart; a second casing hingedly connected to said first casing; a marking member extending from said second casing over the chart; and means within said second casing to impart a reciprocatory motion to the said marking member, and comprising a cylinder provided with a slot in its upper surface; a piston movable in said cylinder; a pin extending from said piston through said slot, and to which said marking member is connected; a cam to reciprocate said piston; and means to rotate said cam.

10. A speed recorder comprising: a suitable casing; a chart support within the same for a rotatable chart; a second casing hingedly connected to said first casing; a marking member extending from said second casing over the chart; means within said second casing to impart a reciprocatory motion to the said marking member, and comprising a cylinder provided with a slot in its upper surface and with a lateral slot; a spring pressed piston movable within said cylinder; a pin extending from said piston through the said slot in the upper surface of the cylinder and to which the said marking member is connected; a pin extending from said piston through said lateral slot; a cam carried by said cylinder and engaging said pin extending through the lateral slot; and means to rotate said cam.

11. A speed recorder comprising: a suitable casing; a chart support within the same for a rotatable chart; a second casing; a marking member extending therefrom over said chart; a pin extending from said first casing into said second casing; a third casing fixedly secured to said first casing, and transmission mechanism therein; a bushing extending from said third casing into said second casing, whereby through said pin and bushing the second casing is hingedly connected with said first casing; a shaft passing through said bushing and driven by said transmission mechanism; means within said second casing to impart a reciprocatory motion to said marking member; and means to connect said shaft passing through said bushing with said means to impart reciprocatory motion to the marking member.

12. A speed recorder comprising: a suitable casing; a chart support within the same for a rotatable chart; a second casing; a marking member extending therefrom over said chart; a pin extending from said first casing into second casing; a third casing fixedly secured to said first casing, and transmission mechanism therein; a bushing extending from said third casing into said second casing, whereby through said pin and bushing the second casing is hingedly connected with said first casing; a shaft passing through said bushing and driven by said transmission mechanism; means within said second casing to impart a reciprocatory motion to said marking member, and comprising a cylinder; a piston movable therein; means connecting said piston with said marking member; a cam to reciprocate said piston, said cam being provided with suitable recesses and carried by said cylinder; means connecting said cam with said piston; and pins extending from the said shaft passing through the said bushing to fit the recesses in said cam.

13. A speed recorder comprising: a suitable casing; a chart support within the same for a rotatable chart; a second casing; a marking member extending therefrom over said chart; a pin extending from said first casing into said second casing; a third casing fixedly secured to said first casing, and transmission mechanism therein; a bushing extending from said third casing into said second casing, whereby through said pin and bushing the second casing is hingedly connected with said first casing; a shaft passing through said bushing and driven by said transmission mechanism; means within said second casing to impart a reciprocatory motion to said marking member, and comprising a cylinder provided with a slot in its upper surface and with a lateral slot; a spring pressed piston movable within said cylinder; a pin extending from said piston through the said slot in the upper surface of the cylinder and to which the said marking member is connected; a pin extending from said piston through said lateral slot; a cam carried by said cylinder and engaging said pin extending through the lateral slot, said cam being provided with suitable recesses; and pins extending from said shaft passing through the said bushing to fit the recesses in said cam.

14. A speed recorder comprising: a suitable casing, and a cover therefor; a chart support within said casing for a rotatable chart adapted to rotate at a uniform speed; a marking member passing through said cover and movable over said chart; a cam, and intermediate mechanism to reciprocate said marking member over said chart equal amounts for equal increments of angular motion of the cam; and means to rotate said cam.

15. In a recording device: a suitable casing, and a cover therefor; a chart support within said casing for a rotatable chart; a marking member movable with said cover, a portion of the same being flexible and the marking end of same being adapted to make contact with the surface of said chart before the said cover is completely closed, substantially as and for the purpose set forth.

16. In a recording device: a suitable casing, and a cover therefor; a chart support within said casing for a rotatable chart; a marking member movable with said cover, its marking end being bent toward the said chart and flexible, and adapted to make contact with the surface of said chart before the said cover is completely closed, substantially as and for the purpose set forth.

Signed at New York, in the county of New York, and State of New York, this 6th day of January, A. D. 1911.

WILLIAM H. BRISTOL.

Witnesses:
FREDK. F. SCHUETZ,
SALLY O. YUDIZKY.